May 19, 1959 L. J. E. A. DODIN 2,887,019
VERIFIER FINDER SYSTEM FOR REFLEX CAMERA
Filed Aug. 12, 1955

INVENTOR.
Lucien Jules Emile André Dodin
BY
Singer Stern & Carlberg
Attorneys

United States Patent Office 2,887,019
Patented May 19, 1959

2,887,019

VERIFIER FINDER SYSTEM FOR REFLEX CAMERA

Lucien Jules Emile André Dodin, Canet-Plage, France, assignor to Zeiss Ikon A.G., Stuttgart, Stuttgart, Germany Application August 12, 1955, Serial No. 528,020

Claims priority, application France August 17, 1954

3 Claims. (Cl. 95—42)

This invention relates to single lens reflex cameras and more particularly to a novel and improved range finder system for a single lens reflex camera.

An object of the invention is to provide a simple and accurate range finder system of the kind indicated.

Another object of the invention is to provide a range finder system of the type indicated which simplifies the focusing of single lens reflex cameras.

A further object of the invention is to provide in cameras of the kind indicated having an ocular and an adjustable objective assembly a verifier system disposed at the viewing side of the ocular and adapted to produce split images which coincide when the actual image produced by the objective assembly is in the plane of a reference disc in the camera, whereby the setting of the adjustable objective assembly provides a means of determining the range.

Figure 1:
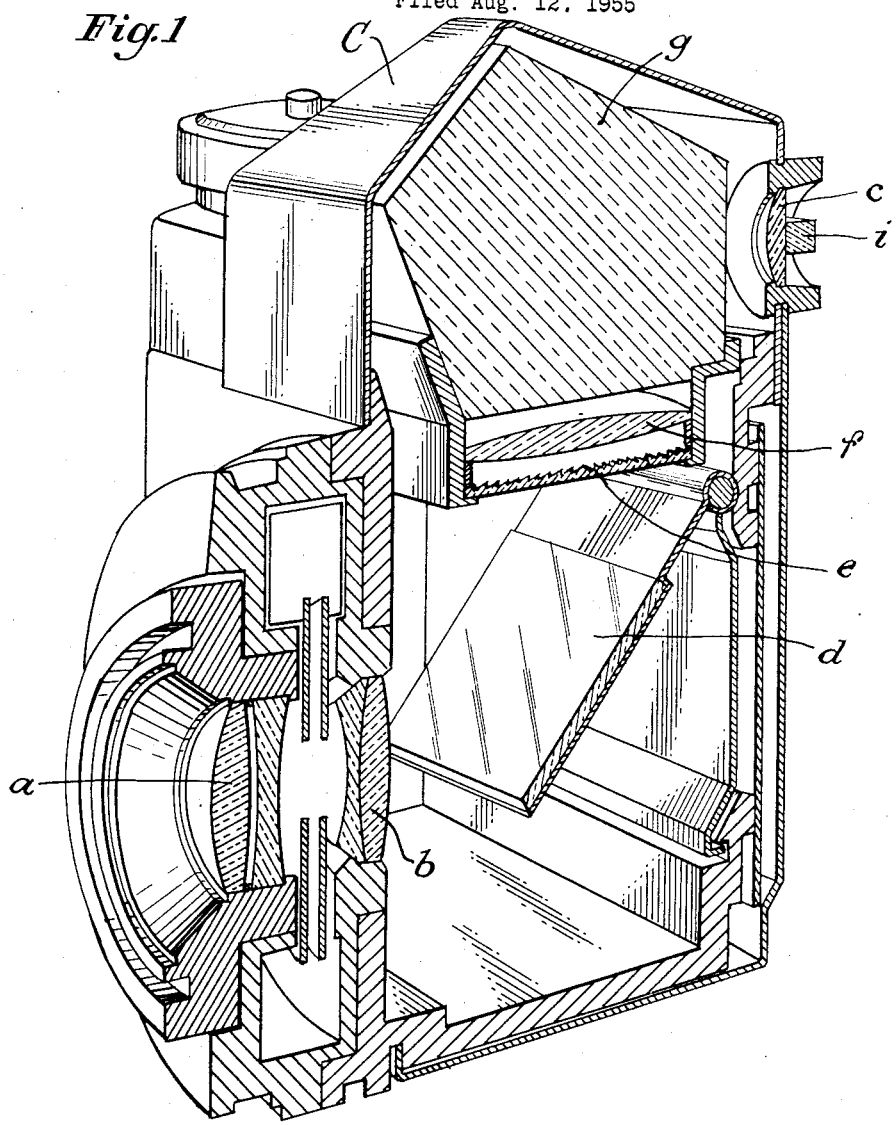
Figure 2:
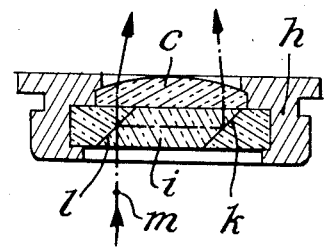

Other objects and advantages of the invention will be apparent from the following description of a preferred embodiment thereof, reference being had to the accompanying drawing in which:

Fig. 1 is a perspective view showing a vertical section through a single lens reflex camera equipped with the inventive range finder system, and Fig. 2 is a cross-sectional view of the ocular and verifier of the camera shown in Fig. 1.

In the embodiment shown, the camera C is provided with an objective assembly comprising a stationary optical part $b$ and a second optical part $a$ which is movable along the optical axis of the objective for focal adjustment. The means for moving the part $a$ are conventional and, together with other conventional operating means in the camera, omitted from the drawing for the sake of clarity. A reflecting member, such as a mirror $d$ is mounted within the camera for pivotal movement on a horizontal axis between a substantially horizontal position and the inclined position shown in Fig. 1, in which latter position the mirror $d$ intercepts light rays entering through the objective assembly and reflects them towards a transparent reference disc $e$, in this case shown as a Fresnel lens.

Above the disc $e$, a lens $f$ and a prism $g$ are disposed and so arranged as to direct the rays passing through the disc $e$ towards an ocular $c$ disposed in an attachment member $h$ (Fig. 2) mounted in the rear wall of the camera. A verifier system $i$ is secured in said attachment member $h$ on the outer side of the ocular $c$. The verifier system $i$ includes a prism having an inclined semi-transparent surface $l$ and a reflecting surface $k$ parallel with said surface $l$.

The arrangement of the optical parts of the camera is such that light rays entering through the objective assembly and reflected by the mirror $d$ produce a sharp image in the plane of the disc $e$ or in a plane above or below said disc depending upon the adjusted position of the movable part $a$ of the objective assembly. When the sharp image is produced in a plane above or below the disc $e$, a viewer sees two images through the ocular-verifier unit $c$, $i$ in accordance with the well known principle of "split image" production as diagrammatically illustrated by the arrowed ray $m$ in Fig. 2. By suitable adjustment of the objective assembly part $a$ said two images may be caused to cover each other completely so that only a single image appears to the viewer, and this occurs when the rays reflected from the mirror $d$ produce a sharp image in the plane of the disc $e$. Apparently, therefore, the adjusted position of the part $a$ provides an accurate indication of the exposure range.

It should be understood that the embodiment shown and described represents an example only and is not intended as a limitation of the scope of the invention as various modifications are feasible without departure from the scope and spirit of the invention as defined in the appended claims.

What I claim is:

1. In a single lens reflex camera, a casing having a front wall with an opening therein, means defining an objective assembly aligned with said opening and having at least one operative part thereof movable axially, means defining a reflecting surface mounted in said casing for movement to and from a position in which said reflecting surface intercepts the optical axis of said objective assembly, means defining a transparent reference disc supported in said casing and so interrelated with said objective assembly and reflecting surface as to enable light rays entering through said objective assembly to produce an actual image in the plane of said reference disc, means supported on said casing and defining an ocular for viewing the image produced by said objective assembly and reflecting surface, and means defining a stationary verifier system disposed at the viewing side of said ocular and adapted to produce split images which coincide when said actual image is in the plane of said reference disc, whereby the setting of the movable part of said objective assembly provides a means of determining the range.

2. A range finder system in a single lens reflex camera, comprising in combination a casing having a front wall opening therein, means defining an objective assembly supported on said casing in alignment with said opening and including at least one axially adjustable part, means defining a mirror mounted in said casing for movement to and from a position in which it is intercepted at an angle by the optical axis of said objective assembly, means defining a transparent reference disc stationarily supported in said casing in such interrelation with said objective assembly and mirror as to enable light rays entering through said objective assembly and reflected by said mirror to produce an actual image in the plane of said reference disc, stationary means supported by said casing and defining an ocular through which said actual image may be viewed, and means defining a verifier system attached to the outer lens face of said ocular and adapted, according to the split image method, to produce split images accurately coinciding only when said actual image is in the plane of said reference disc, whereby the axial distance of the movable part of said objective assembly from a predetermined reference point may serve as an indication of the range.

3. In a single lens reflex camera, a casing having a front wall with an opening therein, means defining an objective assembly aligned with said opening and having at least one operative part thereof movable axially, means defining a reflecting surface mounted in said casing for movement to and from a position in which said reflecting surface intercepts the optical axis of said objective assembly, means defining a transparent reference disc supported in said casing and so interrelated with said objective assembly and reflecting surface as to enable light rays entering through said objective assembly to produce an actual image in the plane of said reference disc, means supported on said casing and defining an ocular for viewing the image produced by said objective assembly and reflecting surface, and means defining a stationary verifier system disposed at the viewing side of said ocular and including optical elements having a semi-transparent reflecting surface and a laterally displaced reflecting surface, said semi-transparent reflecting surface and said reflecting surface being so interrelated as to produce a split image effect with the split images accurately coinciding only when the setting of the movable part of said objective assembly is such as to place said actual image in the plane of said reference disc, whereby the setting of the movable part of said objective assembly may be used to determine the range.

References Cited in the file of this patent

UNITED STATES PATENTS

| | | |
|---|---|---|
| 1,993,463 | Thorner | Mar. 5, 1935 |
| 2,341,410 | Mihalyi | Feb. 8, 1944 |

FOREIGN PATENTS

| | | |
|---|---|---|
| 166,179 | Great Britain | July 11, 1921 |